United States Patent [19]

Kuehne et al.

[11] Patent Number: 5,142,110
[45] Date of Patent: Aug. 25, 1992

[54] MODIFIED MAGNE-BLAST CIRCUIT BREAKER AND METHOD OF MODIFICATION

[76] Inventors: Edward J. Kuehne; William A. McCloy; Mark S. McCloy, all of c/o Power Distribution Services, Inc. 9879 Crescent Park Dr., West Chester, Ohio 45069

[21] Appl. No.: 644,790

[22] Filed: Jan. 23, 1991

[51] Int. Cl.⁵ .................. H01H 33/46; H01H 33/66; H02B 00/00

[52] U.S. Cl. ..................... 200/144 B; 200/50 AA; 361/335

[58] Field of Search .......... 200/50 AA, 144 B, 148 R, 200/147 R; 361/331-345

[56] References Cited

U.S. PATENT DOCUMENTS 4,950,854  8/1990  Green ........................... 200/144 B Primary Examiner—J. R. Scott
Attorney, Agent, or Firm—Thompson, Hine and Flory

[57] ABSTRACT

A modified magne-blast vertical racking circuit breaker modified to accept vacuum circuit breakers. The main frame of the magne-blast unit is modified to accept the vacuum breaker operating mechanism and vacuum interrupters, which are connected to the load and line stabs of the magne-blast unit. A mechanism operated cell operator is mounted above the vacuum breaker operating mechanism, and the mechanism is modified to accept an interlock switch which is positioned to engage the switch gear associated with the magne-blast breaker. The unit also includes a surge suppressor mounted on the main frame. The modification method includes the removal of the arc chutes, blowout coils, blowout cores, contact arm assemblies, booster cylinders and main operating crank, and replacing them with the vacuum interrupters; the magne-blast operating mechanism is also replaced by the vacuum interrupter operating mechanism. The surge suppressor is mounted in space previously occupied by the arc chutes such that the modified unit can be received in the magne-blast metal-clad switchgear.

7 Claims, 5 Drawing Sheets

MODIFIED MAGNE-BLAST CIRCUIT BREAKER AND METHOD OF MODIFICATION

BACKGROUND OF THE INVENTION

The present invention relates to high voltage circuit breakers and, more particularly, to magne-blast, vertical racking circuit breakers.

Power supply systems are protected by switchgear which includes a circuit breaker. One type of circuit breaker, used in combination with medium range, metal-clad switchgear, is the magne-blast circuit breaker. A magne-blast circuit breaker includes contacts which separate when the breaker is opened, and the arc which extends between the open contacts is interrupted by elongating the arc and forcing it into an arc chute where the arc is cooled. The arc is drawn into the arc chute by means of a strong magnetic field and a blast of cooler air; the air serving the dual function of directing the arc into the chute and cooling it.

Use of magne-blast circuit breakers with metal-clad switchgear has provided advantages of protection to equipment and personnel, compactness, simplified installation and reduced maintenance. However, magne-blast breakers have the disadvantage of requiring arc chutes made of asbestos, which is vaporized somewhat when brought in contact with an arc.

New circuit breakers have been developed in which the breaker elements are enclosed in a vacuum envelope made of a high-density alumina of ceramics or glass. Consequently, the arc produced by the separated contact elements is minimized and enclosed in a sealed bottle. While such vacuum interrupters have many desirable characteristics, among them the elimination of asbestos material, much of the switchgear existing today is specially adapted to receive the earlier magne-blast circuit breakers. One such example of an earlier magne-blast breaker is the General Electric Model AM-13.8-3 magne-blast circuit breaker, which is a vertical racking unit; that is, the load and line stabs of the circuit breaker extend vertically from the main frame of the circuit breaker and are received by the switchgear by elevating the circuit breaker vertically. Accordingly, there is a need for modifying magne-blast vertical racking circuit breakers to receive the more desirable and reliable vacuum interrupters and yet interface with the magne-blast switchgear.

SUMMARY OF THE INVENTION

The present invention is a modified magne-blast circuit breaker and method of modification. The modified magne-blast circuit breaker is altered such that the arc chutes, blowout coils, blowout cores and arcing contacts are removed from the breaker pole units, the operating mechanism is removed and the load and line stabs are reversed front-to-back in orientation. A vacuum interrupter operating mechanism is mounted on the front of the magne-blast main frame and vacuum interrupters are mounted within the main frame in the space previously occupied by the breaker pole units. Bus assemblies connect the vacuum interrupters to the load and line stabs, and preferably the line stabs are shortened in length to provide clearance for the vacuum interrupters.

A mechanism operated cell ("MOC") operator is mounted on the main frame above the vacuum interrupter operating mechanism. The vacuum interrupter operating mechanism is modified to receive a safety interlock which is positioned to engage the switchgear designed to receive the magne-blast circuit breaker.

In the preferred embodiment, the modified breaker includes a surge suppressor which is mounted on its own support frame attached to the main frame in the space previously occupied by the arc chutes. Consequently, the modified circuit breaker can be received within the same switchgear as the original magne-blast unit.

In the method of modification, the magne-blast breaker is dismantled to remove the breaker pole units except for the load and line stabs. The load and line stabs are reversed in orientation and the former load stab (now line stab) is further shortened to provide clearance for the vacuum interrupter. A vacuum interrupter operating mechanism is substituted for the mange-blast operating mechanism and its vacuum interrupter units are connected by buses to the load and line stabs. An MOC operator is mounted on the main frame above the operating unit and a safety interlock switch is attached to the operating unit such that it will engage the appropriate camming slots of the associated switchgear.

The resultant modified unit will still mate properly with existing switchgear, but will have increased interrupting capacity, longer life and will not produce elongated arcs in operation, nor will it require asbestos components.

Accordingly, it is an object of the present invention to provide a modified mange-blast circuit breaker and modification method which will yield a superior circuit breaker capable of mating with existing magne-blast vertical racking switch gear; a circuit breaker which has increased performance over prior magne-blast circuit breaker designs; a circuit breaker which has greater reliability and lower maintenance than previous magne-blast designs; and a circuit breaker which is less expensive than a new unit, yet possesses the same beneficial operating characteristics of an O.E.M. vacuum interrupter circuit breaker.

Other objects and advantages will become apparent from the following description, the accompanying drawings and the appended claims.

DETAILED DESCRIPTION

Figure 1:
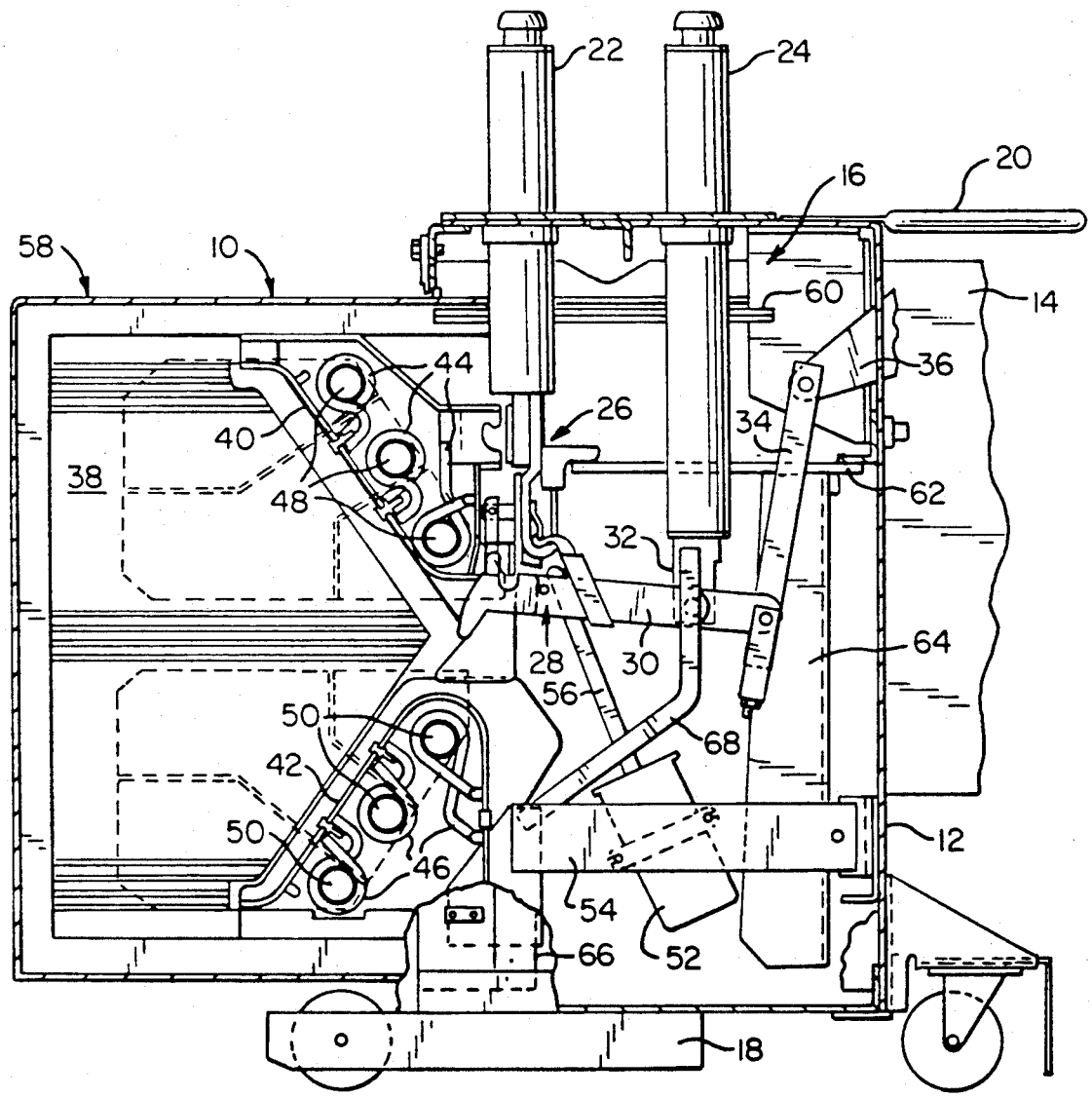
FIG. 1 is a schematic side elevation in section of a typical prior art magne-blast circuit breaker.

As shown in FIG. 1, a typical prior art magne-blast, vertical racking circuit breaker, generally designated 10, comprises a main frame 12 which supports an operating mechanism 14 and three breaker pole units, each generally designated 16 (only one being shown). The main frame 12 includes a wheeled chassis 18 and a pull handle 20 which enables the unit 10 to be maneuvered on a floor into and out of switchgear (not shown).

Each breaker pole unit 16 includes vertically-oriented load and line stabs 22, 24, respectively, which are attached to and extend through the main frame 12. The load stab 22 is connected to a stationary contact assembly, generally designated 26 which, in turn, is connected to a movable contact assembly, generally designated 28. Movable contact assembly 28 includes a movable contact arm 30 which is pivotably attached to the stud 32 of the line stab 24. The contact arm 30 is pivotably connected to an operating rod 34 which, in turn, is connected to the main operating crank 36 of the operating mechanism 14.

Each breaker pole unit 16 includes an arc chute 38 having upper and lower arc runners 40, 42, upper and lower blow out coils 44, 46 and upper and lower blow out cores 48, 50. A booster cylinder 52 is mounted on a support plate 54 of the main frame 12 and includes a booster tube 56 for directing a stream of compressed air to the connection between the movable contact arm 30 and stationary contact assembly 26 to urge an arc formed by an open circuit into the arc chute 38.

Each pole unit 16 is enclosed in a box barrier 58, each upper and lower horizontal barriers 60, 62, respectively, a front vertical barrier 64 and a side barrier 66. A connection bar 68 extends between the stud 32 of line stab 24 and the support plate 54 to add stiffness to the line stab 24.

Figure 2:
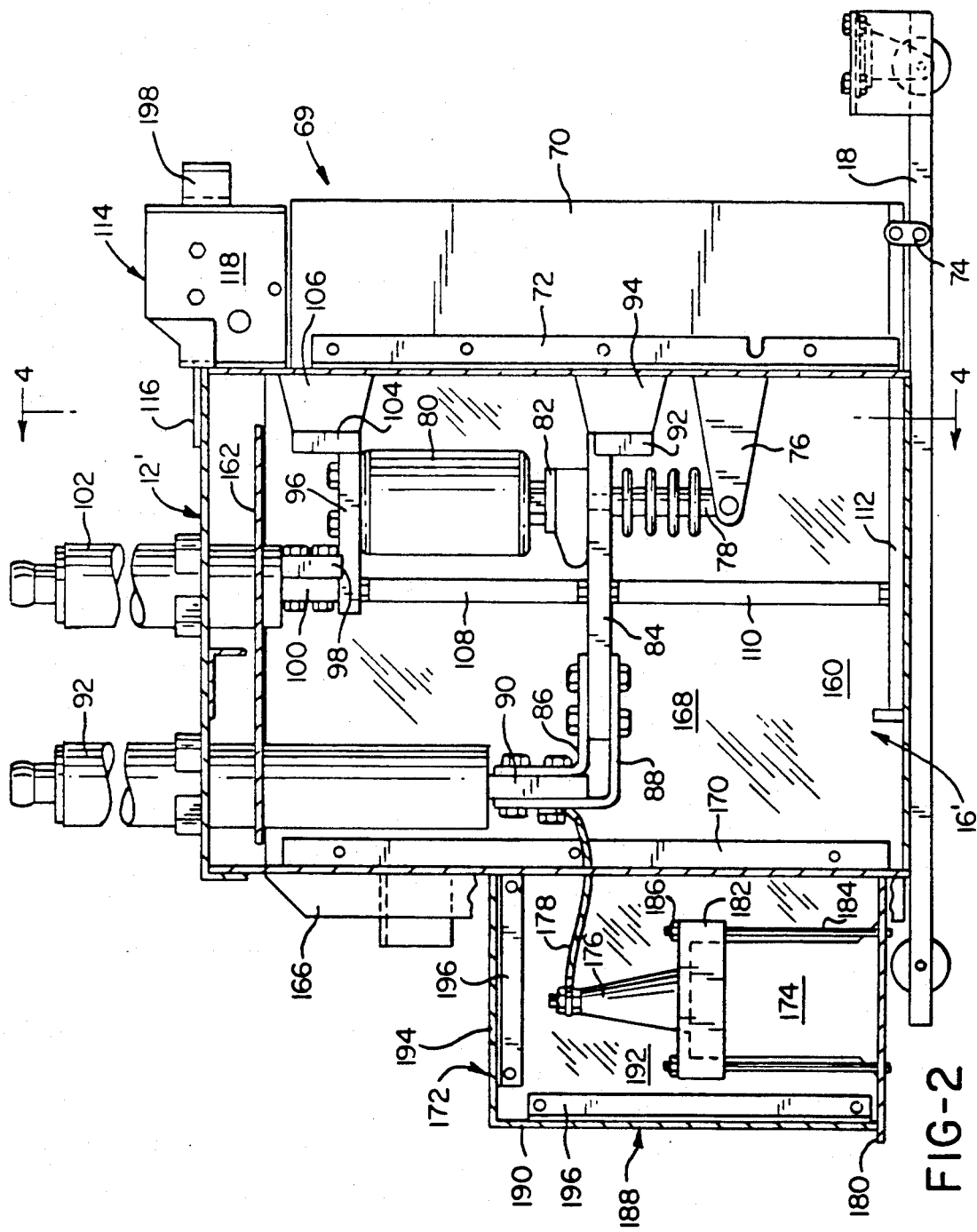
FIG. 2 is a schematic side elevation of a modified magne-blast circuit breaker showing a preferred embodiment of the invention.
Figure 3:
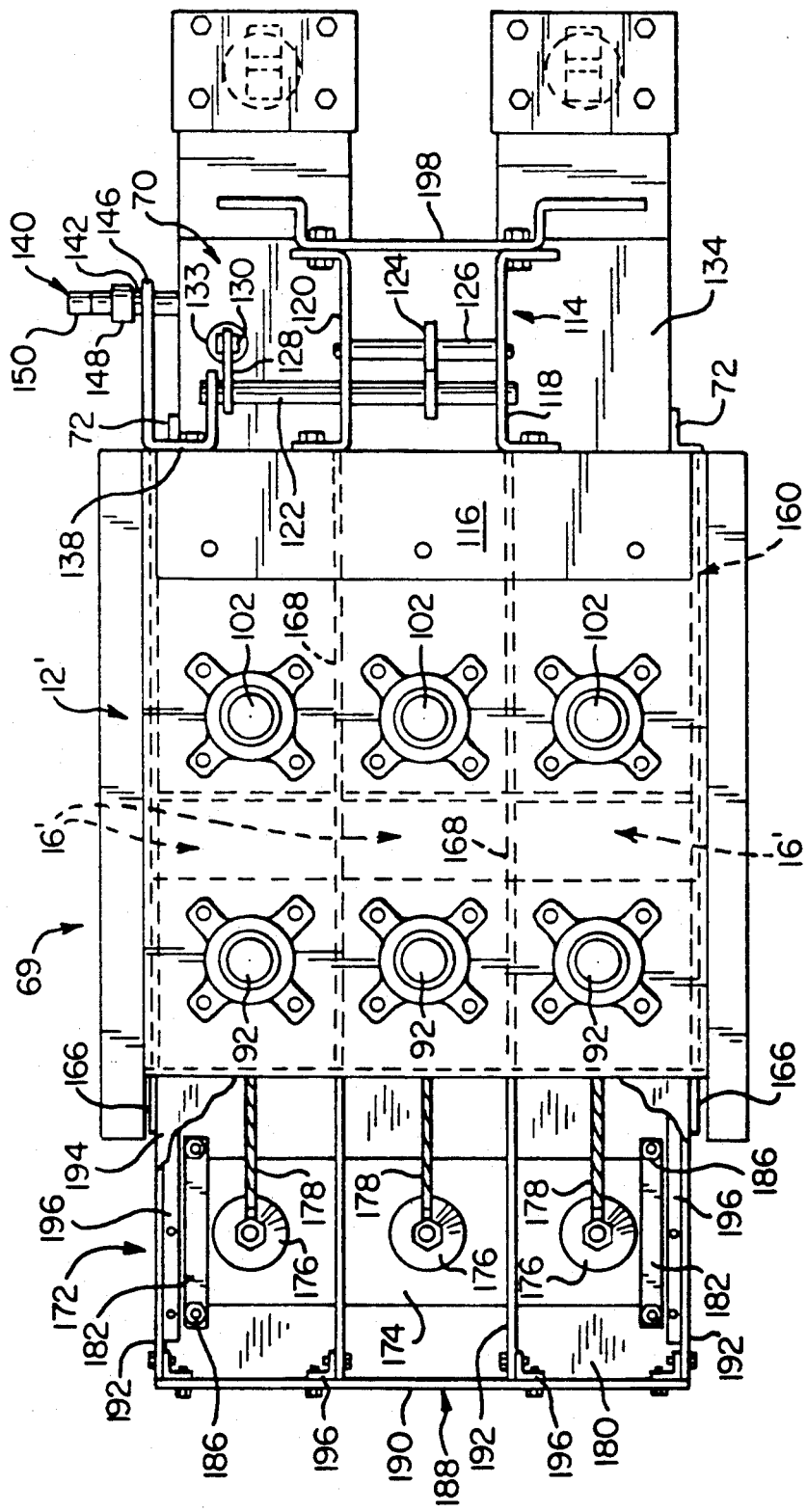
FIG. 3 is a top plan view of the circuit breaker of FIG. 2.

The modified magne-blast circuit breaker of the present invention, generally designated 69, is shown in FIGS. 2-5. Generally speaking, the magne-blast circuit breaker 10 (FIG. 1) has been modified to accept a vacuum interrupter circuit breaker such as the Toshiba vacuum circuit breaker type VK1025, originally designed to be used with horizontal racking switchgear. As shown in FIGS. 2 and 3, the operating mechanism 14 (see FIG. 1) of the magne-blast unit 10 has been removed and the operating mechanism 70 of the vacuum breaker inserted in its place. The operating mechanism 70 is mounted on the main frame 12' by side brackets 72 and a bottom support bracket 74, the latter attaching the operating mechanism to the chasis 18.

Figure 4:
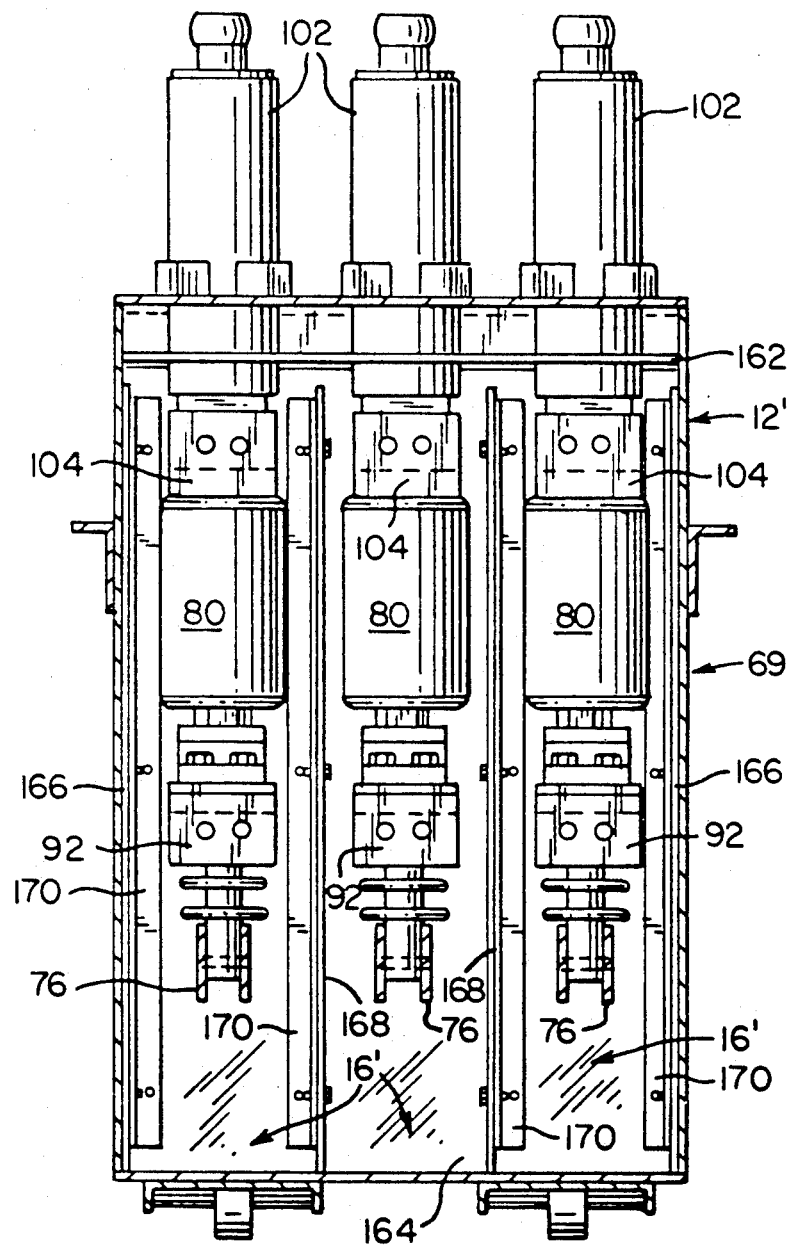
FIG. 4 is an elevational view in section taken at line 4—4 of FIG. 2.

As shown in FIGS. 2 and 4, the main operating cranks 76 of the operating mechanism 70 are each pivotably attached to a vertical actuation rod 78 that forms a part of a vacuum interrupter 80, the three interrupters 80 forming pole units 16; with each pole unit 16'; the interrupter 80 is attached by a flexible conductor 82 to a bottom bus 84. The bottom bus 84 is connected by upper and lower L-shaped connecting brackets 86, 88 to the stud 90 of the load stab 92. The bottom bus 84 includes a boss 92 which is connected to a stand-off insulator 94 mounted on the frame 12'. The vacuum interrupter 80 is connected at an opposite end to a top bus 96 which includes an upright boss 98 that is bolted to a stud 100 extending downwardly from the line stab 102. The top bus 96 includes a front boss 104 that is connected to a stand-off insulator 106 mounted on the frame 12'.

It should be noted that load and line stabs 92, 102 are the same as line and load stabs 24, 22 in FIG. 1, except that they have been reversed, front-to-back, in orientation. Further, line stab 102 (formerly load stab 22) has been shortened, by removing insulation and shortening the copper core, to provide clearance for the vacuum interrupter 80.

A support rod 108 extends between the top bus 96 and bottom bus 84, and a support rod 110 extends between bottom bus 84, and interrupter frame 112. Rods 108, 110 add stiffness to the top and bottom bus assemblies.

Figure 5:
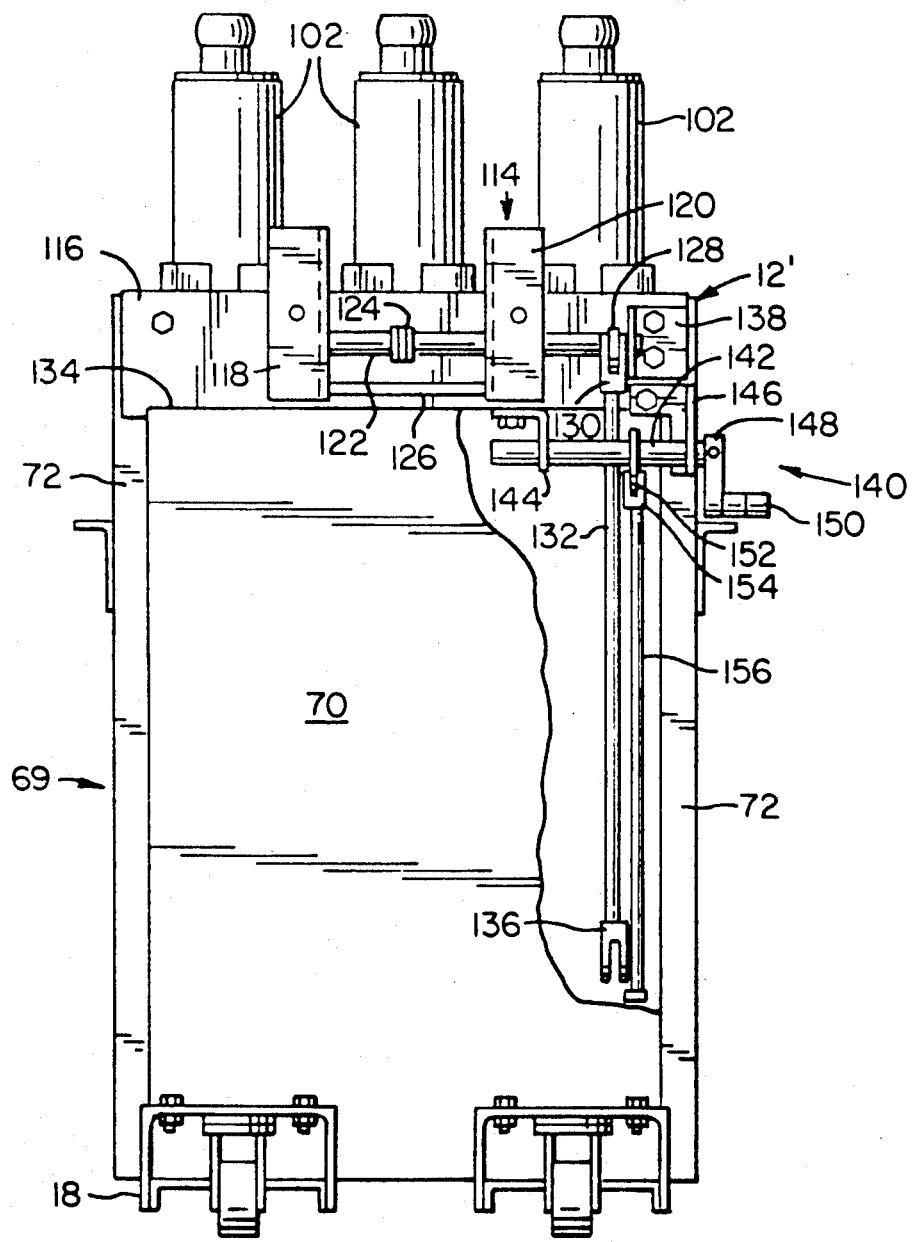
FIG. 5 is a front elevation of the embodiment of FIG. 2, partially broken away to show the modifications made to the operating mechanism.

As shown in FIGS. 2, 3, and 5, a mechanism operated cell ("MOC") operator switch, generally designated 114, is mounted on the frame 12 above the operating mechanism 70. The frame 12' has been modified to include an L-shaped top plate 116 on which the MOC operator 114 is mounted. The MOC operator 114 includes a pair of C-shaped brackets 118, 120 in which is journaled an axle 122 that supports a switch lever at 124. The switch lever 124 engages the switch operating mechanism. A stiffening bar 126 extends between the brackets 118, 120 to add stiffness.

The axle 122 extends outwardly from bracket 120 and carries arm 128 which is pivotably connected to a clevis 130. An actuation rod 132 is attached to the clevis 130 and extends downwardly through an opening 133 in the top cover 134 of the operating mechanism and terminates in a clevis 136 which engages the main shaft of the operating mechanism 70. The outer end of the axle 122 is received in an outer switch operator bracket 138 which is attached to the top plate 116.

As shown in FIGS. 3 and 5, safety interlock operating mechanism, generally designated 140, includes a shaft 142 which is journaled into a support bracket 144 that is attached to the underside of the top cover 134 and a bracket 146 which is attached to the main frame 12'. An actuator arm 148 is mounted on the shaft 142 and supports a boss 150 which is positioned to engage a camming slot in the associated switchgear (not shown). The shaft 142 supports a link arm 152 which is pivotably attached to a clevis 154 that, in turn, is attached to an actuator rod 156. The actuator rod terminates to the safety interlock switch (not shown) in the operating mechanism 70. When racked vertically, the safety interlock mechanism 140 engages a cam slot in the switchgear which would not allow breaker to be installed while in the closed position.

Consequently, the modified circuit breaker 69 is fully capable of interfacing with both the MOC operator and safety interlock mechanisms of the switchgear by means of the MOC operator switch 114 and the interlock operating mechanism 140. The mechanisms 114 and 140 act to interconnect the operating mechanism 70 with the switchgear that previously received the prior art breaker 10 (see FIG. 1) without modification of the switch gear. Further, the load and line stabs 92, 102 are also appropriately positioned on the frame 12' to engage the switchgear.

As shown in FIGS. 2, 3 and 4, in order to isolate the three breaker pole units 16' electrically, a main frame barrier box 160 is provided. The barrier box includes a horizontal barrier 162 which is attached to the main frame 12'. The remainder of the barrier box assembly 160 comprises a rear wall 164, side walls 166 and intermediate walls 168. As shown in FIG. 2, the end walls 166 project rearwardly beyond the main frame 12'. The rear wall 164, side walls 166, and interior walls 168 are all joined together by angle bracket and screw combinations 170. The barrier box 160 is made of a dielectric material such as a GP-03 phenolic fiberboard.

As shown in FIGS. 2 and 3, the modified unit 69 includes a surge suppressor assembly, generally designated 172. The surge suppressor assembly 172 includes a surge suppressor 174 such as, for example, a Toshiba CR surge suppressor. The electrodes 176 of the surge suppressor 174 are connected by cables 178 to the connectors 88 of the load stabs 92 for each of the pole units 16'. The surge suppressor 174 is mounted on a support plate 180 which is attached to the main frame 12'. A pair of angle brackets 182 engage the upper surface of the surge suppressor 174 and are connected to the support plate 180 by threaded rods 184 and nuts 186.

The surge suppressor 174 is enclosed in a barrier box generally designated 188. The barrier box includes a rear wall 190, side walls 192 and a top wall 194, all connected by angle bracket and screw combinations 196. The barrier box 188 is shaped such that the outer side walls 192 engage the extensions of the side walls 166 of the main frame barrier box 160 in a telescoping or sleeve-like fit, thereby providing a continuous dielectric barrier. As with the main frame barrier box 160, the barrier box 188 is made of a dielectric material such as a GP-03 phenolic fiberboard.

To enable the modified breaker 69 to be moved into and out of position with respect to switchgear, the MOC operator 114 includes a pull handle 198 shown in FIGS. 2 and 3 (not shown in FIG. 5 for purposes of clarity).

The method of modifying the circuit breaker 10 shown in FIG. 1 to the modified unit 69 shown in FIGS. 2-5 is as follows. The initial step is to completely dismantle the breaker 10 and discard the stationary contact assembly 26, moveable contact assembly 28, arc chutes 38, arc runners 40, 42, blow out coils 44, 46, blow out cores 48, 50, booster cylinder 52, support plate 54 and main operating crank mechanism 36, 34 from each pole unit 16. Further, the operating unit 14, box barrier 58, front vertical barrier 64 and side barrier 66 are removed.

The load and line stabs 22, 24 are removed (and preferably reconditioned) reversed in orientation from front to rear, and the load stab 22 (now line stab 102) is shortened in length by removing a portion of the outer insulating sleeve and central copper core.

The vacuum interrupter breaker is selected and the unnecessary components are removed from the interrupter frame 112, such as the wheels (not shown) and secondary disconnect (not shown). The original insulation barrier (not shown) is also removed. The operating mechanism 70 is mounted on the frame 12' and is received within the brackets 72 which have been attached to the modified frame. The top and bottom buses 96, 84 are then attached to the vacuum interrupter for each modified pole unit 16' and are secured in position with support rods 108, 110.

The surge suppressor assembly 172 is assembled by mounting the support plate 180 on the main frame 12'.

The main frame barrier box 160 is added to isolate the pole units 16', and the surge suppressor 174 is mounted on the support plate 180. The surge suppressor 174 is connected to the bottom bus 88 of the load stab 92 and the barrier box 188 for the surge suppressor is added.

The operating mechanism 70 is modified by substituting the top plate 134 and adding the interlock operator mechanism 140. The main frame 12' is modified to add the top plate 116 to which the MOC operator 114 and pull handle 198 are added. The modified circuit breaker 69 will now properly mate with the preexisting switchgear with minimal adjustments. It should be noted that the location of the surge suppressor assembly 172 is in the space formerly occupied by the arc chutes 38 and therefore does not present a clearance problem.

While the form of apparatus herein described constitutes a preferred embodiment of this invention, it is to be understood that the invention is not limited to this precise form of apparatus, and that changes may be made therein without departing from the scope of the invention.

What is claimed is:

1. A modified magne-blast vertical racking circuit breaker comprising:
   a main frame including a wheeled chassis adapted to be received in a power switchgear assembly, and having a pair of vertically-extending brackets on a forward end thereof;
   a vacuum breaker operating mechanism having a housing attached to said brackets;
   a plurality of breaker pole units actuated by said operating mechanism and mounted within said main frame, each of said breaker pole units including
      a vertically-oriented vacuum interrupter having an actuating rod extending downwardly therefrom, said actuating rod being operatively connected to said operating mechanism,
      a line stab extending upwardly from said frame and positioned adjacent to said vacuum interrupter, said line stab having a boss extending downwardly therefrom adjacent to a top surface of said vacuum interrupter,
      a top bus bar connected at a midportion thereof to said top surface, at a forward end to said housing by an insulated connection and at a rearward end to said line stab boss, and
      a load stab extending upwardly from said frame and positioned rearward of said line stab, said load stab having a boss extending downwardly therefrom at an elevation below said vacuum envelope,
      a bottom bus bar connected at a midportion thereof to said rod, at a forward end to said housing by an insulated connection, and at a rearward end to said load stab boss;
   mechanism operated cell means, mounted on said main frame above said operating mechanism, for engaging switchgear such that said switchgear activates said operating mechanism; and
   interlock operator means, operatively connected to said operating mechanism and including a cam pivotably journaled in said operating mechanism and extending sidewardly therefrom, for engaging a cam slot on said switchgear assembly to prevent said circuit breaker from being in a closed condition during vertical racking thereof.

2. The circuit breaker of claim 1 further comprising surge suppressor means having a plurality of electrodes, each being operatively connected to a corresponding one of said load stab bosses; and a suppressor support plate attached to said main frame and extending rearwardly therefrom, said plate supporting said surge suppressor means.

3. The circuit breaker of claim 2 further comprising a main frame barrier assembly having substantially vertical walls interposed between said breaker elements and extending lengthwise of said main frame, a rear wall extending transversely of a rear face of said main frame and a top wall positioned above said vacuum interrupters and receiving said load and line stabs therethrough; and a surge suppressor barrier box having substantially vertical walls interposed between said electrodes, a top wall and a rear wall, said main frame barrier assembly having a pair of rewardly-extending flanges shaped to receive said surge suppressor barrier box therebetween.

4. The circuit breaker of claim 1 wherein said mechanism operated cell means comprises a pair of switch operator brackets mounted on and extending forwardly of said main frame above said operating mechanism; an axle rotatably journaled between said switch operator brackets, a switching arm mounted on said axle between said brackets for engagement by said switchgear; a switching bracket mounted on said rod; and a switch operator push rod pivotably attached at an upper end thereof to said switching bracket, and at a lower end thereof to a disconnect switch of said operating unit.

5. The circuit breaker of claim 1 wherein said cam of said interlock operator means comprises an operator rod pivotably journaled in said operating mechanism and extending sidewardly therefrom; a cam arm extending rearwardly from said operator rod; a cam boss mounted on said cam arm; an interlock bracket mounted on said operator rod; and an interlock push rod pivotably attached at an upper end thereof to said interlock bracket and at a lower end to an interlock lever of said operating mechanism.

6. A method of modifying a magne-blast circuit breaker to accept a vacuum interrupter unit and remain compatible with switchgear for said circuit breaker, the magne-blast breaker of the type having a main frame enclosing a plurality of breaker pole units, each of said units having front and rear load and line stabs, a barrier box assembly, an arc chute, upper and lower blow out coils, upper and lower blow out cores, a contact arm assembly, a booster cylinder, a main operating crank, and an operating mechanism activated by said switchgear to disengage said contact arm assemblies of said pole units, the method comprising the steps of:

removing from each of said breaker pole units said arc chutes, said upper and lower blow out coils, said upper and lower blow out cores, said contact arm assembly, said booster cylinder, said main operating crank and said barrier box assembly;

removing said operating mechanism;

reversing orientation of said front and rear load and line stabs;

mounting an operating mechanism of a vacuum interrupter on said main frame of said circuit breaker;

mounting a plurality of vacuum interrupters on said interrupter operating unit and connecting said interrupters to said load and line stabs;

mounting a mechanism operated cell operator on said main frame above said interrupter operating unit and connecting said operator to a disconnect switch of said interrupter operating unit;

mounting an interlock switch on said interrupter operating unit positioned to engage switchgear for said mange-blast breaker, and connected to an interlock switch on said vacuum interrupter operating mechanism; and placing a breaker box barrier in said main frame such that said interrupters are isolated from each other.

7. The method of claim 6 further comprising the step of mounting a surge suppressor on said main frame in an area formerly occupied by said arc chutes, and connecting said surge suppressor to said load stabs.

* * * * *